US012800209B2

(12) United States Patent
Sowani

(10) Patent No.: US 12,800,209 B2
(45) Date of Patent: Nov. 17, 2026

(54) COMPRESSOR VOLTAGE PROTECTION MODULE ENABLING BASED ON SOFT STARTER DETECTION

(71) Applicant: Copeland LP, Sidney, OH (US)

(72) Inventor: Chetan Avinash Sowani, Pune (IN)

(73) Assignee: Copeland LP, Sidney, OH (US)

( * ) Notice: Subject to any disclaimer, the term of this patent is extended or adjusted under 35 U.S.C. 154(b) by 201 days.

(21) Appl. No.: 18/240,182

(22) Filed: Aug. 30, 2023

(65) Prior Publication Data

US 2024/0077240 A1 Mar. 7, 2024

(30) Foreign Application Priority Data

Sep. 2, 2022 (IN) ............................. 202221050278

(51) Int. Cl.
*F25B 49/02* (2006.01)
*H02H 1/00* (2006.01)
*H02H 3/20* (2006.01)

(52) U.S. Cl.
CPC ......... *F25B 49/022* (2013.01); *H02H 1/0038* (2013.01); *H02H 3/20* (2013.01);
(Continued)

(58) Field of Classification Search
CPC .......................... F25B 49/022; F25B 2500/26; F25B 2600/01; F25B 2700/151; H02H 1/0038
See application file for complete search history.

(56) References Cited

U.S. PATENT DOCUMENTS 5,126,642 A 6/1992 Shahrodi
5,198,733 A * 3/1993 Wright .................... H02P 6/185 318/400.34

(Continued)

FOREIGN PATENT DOCUMENTS

CA 2999318 A1 9/2018
CN 205092796 U 3/2016

(Continued)

OTHER PUBLICATIONS

International Search Report and Written Opinion of ISA issued in PCT/US2023/031844, mailed Dec. 20, 2023; ISA/KR.

(Continued)

*Primary Examiner* — Crystal L Hammond
*Assistant Examiner* — Samantha L Faubert
(74) *Attorney, Agent, or Firm* — Harness, Dickey & Pierce, P.L.C.

(57) ABSTRACT

A heating ventilation and air-conditioning system is disclosed and includes: at least one analog-to-digital converter configured to sample a voltage signal on or across one or more power lines to provide samples, the one or more power lines supplying power to a compressor; a voltage-based protection module configured to execute one or more voltage-based protection algorithms to protect the compressor; and a soft starter detection module configured, based on the samples, to detect i) presence of a soft starter, and ii) activity of the soft starter ramping up current to the compressor, and to, based on detecting the presence of the soft starter and the activity of the soft starter, disable voltage-based protection provided by the voltage-based protection module.

22 Claims, 6 Drawing Sheets

(52) U.S. Cl.
CPC ....... *F25B 2500/26* (2013.01); *F25B 2600/01* (2013.01); *F25B 2700/151* (2013.01)

(56) References Cited

U.S. PATENT DOCUMENTS

| | | | | |
|---|---|---|---|---|
| 5,978,195 | A * | 11/1999 | Goder | H02H 7/1227 361/86 |
| 6,163,129 | A | 12/2000 | Younger et al. | |
| 6,516,279 | B1 | 2/2003 | Jansen et al. | |
| 7,089,088 | B2 | 8/2006 | Terry et al. | |
| 7,352,141 | B2 | 4/2008 | Kling et al. | |
| 7,602,128 | B2 | 10/2009 | Kling et al. | |
| 7,859,217 | B2 | 12/2010 | Mayhew | |
| 7,892,304 | B2 * | 2/2011 | Hajiaghajani | C01B 3/382 322/54 |
| 7,957,166 | B2 | 6/2011 | Schnetzka et al. | |
| 9,588,152 | B2 * | 3/2017 | Ye | G01R 19/02 |
| 9,722,513 | B2 | 8/2017 | Bock et al. | |
| 9,806,641 | B2 | 10/2017 | Bock et al. | |
| 10,862,416 | B2 * | 12/2020 | Nannen | H02P 21/22 |
| 12,095,391 | B2 * | 9/2024 | Devos | H02P 1/026 |
| 2004/0012351 | A1 | 1/2004 | Ohlsson et al. | |
| 2016/0197566 | A1 * | 7/2016 | Alvey | H02P 1/423 318/816 |

FOREIGN PATENT DOCUMENTS

| | | | | |
|---|---|---|---|---|
| CN | 209963973 | U | 1/2020 | |
| EP | 2293426 | A1 | 3/2011 | |
| EP | 2337177 | B1 | 6/2017 | |
| KR | 20100123651 | A | 11/2010 | |
| KR | 101114980 | B1 * | 3/2012 | H02P 1/54 |
| WO | 2017054596 | A1 | 4/2017 | |
| WO | 2019218796 | A1 | 11/2019 | |

OTHER PUBLICATIONS

India First Examination Report regarding Application No. 202221050278, dated Feb. 2, 2026, with English translation.

Search Report regarding European Patent Application No. 23861344.2, dated May 12, 2026.

* cited by examiner

COMPRESSOR VOLTAGE PROTECTION MODULE ENABLING BASED ON SOFT STARTER DETECTION

CROSS-REFERENCE TO RELATED APPLICATIONS

This application claims the benefit and priority of Indian Patent Application No. 202221050278 filed Sep. 2, 2022. The entire disclosure of the above application is incorporated herein by reference.

FIELD

The present disclosure relates to voltage protection modules for compressors of heating, ventilation and air-conditioning (HVAC) systems.

BACKGROUND

The background description provided here is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Compressor protection modules in HVAC systems protect compressors from various faults. Some example compressor protection modules include a positive temperature coefficient (PTC) based motor protection module, a negative temperature coefficient (NTC) based scroll over temperature protection module, a reverse phase protection module, a single phasing protection module, over and under voltage protection modules, a phase imbalance protection module, frequency supply over and under range protection modules, and a compressor short cycling protection module. The PTC based motor protection module and the NTC based scroll over temperature protection module prevent compressor overheating events. The reverse phase protection module prevents reverse rotation of a compressor.

The single phasing protection module prevents the compressor from operating when a phase of the compressor is lost. The over and under voltage protection modules prevent the compressor from operating when voltages are above or below predetermined safe voltage operating ranges. The phase imbalance protection module prevents the compressor from operating when the phases of the compressor are unbalanced such that voltages of one phase are less than voltages of another phase. The frequency supply over and under range protection modules prevent the compressor from operating when the frequency of power supplied to the compressor is not within a predetermined safe operating range. The compressor short cycling protection module prevents the compressor from operating when a cooling cycle of the compressor is reduced causing the compressor to turn ON and OFF more often, which can degrade the compressor.

SUMMARY

A heating ventilation and air-conditioning system is disclosed and includes: at least one analog-to-digital converter configured to sample a voltage signal on or across one or more power lines to provide samples, the one or more power lines supplying power to a compressor; a voltage-based protection module configured to execute one or more voltage-based protection algorithms to protect the compressor; and a soft starter detection module configured, based on the samples, to detect i) presence of a soft starter, and ii) activity of the soft starter ramping up current to the compressor, and to, based on detecting the presence of the soft starter and the activity of the soft starter, disable voltage-based protection provided by the voltage-based protection module.

In other features, the soft starter detection module is configured to: disable the voltage-based protection provided by the voltage-based protection module during a soft start ramp up period; and enable the voltage-based protection provided by the voltage-based protection module in response to detecting an end of the soft start ramp up period.

In other features, the soft starter detection module is configured to: detect whether the voltage signal is a chopped voltage signal; in response to detecting that the voltage signal is a chopped voltage signal, determine that the soft starter is ramping up current to the compressor; and in response to detecting that the voltage signal is not a chopped voltage signal, determine that the soft starter is not ramping up current to the compressor.

In other features, the soft starter detection module is configured to: determine a first root mean square voltage of the voltage signal; determine a second root mean square voltage of the voltage signal; based on a difference between the first root mean square voltage and the second root mean square voltage, determine whether the soft starter is ramping up the current to the compressor; and disable the voltage-based protection provided by the voltage-based protection module in response to determining that the soft starter is ramping up the current to the compressor.

In other features, the soft starter detection module is configured to: determine the first root mean square voltage-based on a square root of an average sum of squares of the samples of the voltage signal; and determine the second root mean square voltage-based on a peak of the samples of the voltage signal divided by a square root of 2.

In other features, the soft starter detection module is configured to: track an amount of time during a startup of the compressor that the soft starter is ramping up current to the compressor; compare the amount of time to a maximum ramp time; and based on the comparison of the amount of time and the maximum ramp time, enable the voltage-based protection provided by the voltage-based protection module.

In other features, the soft starter detection module is configured to: in response to the amount of time being longer than the maximum ramp time, enable the voltage-based protection provided by the voltage-based protection module; and in response to the amount of time being less than or equal to the maximum ramp time, maintaining the voltage-based protection module in a disabled state.

In other features, the soft starter detection module is configured to: determine a peak voltage of the samples; determine a present partial sum of the samples; determine an accumulated partial sum based on the present partial sum; determine a first voltage-based on the accumulated partial sum; determine a second voltage-based on the peak voltage; and based on the first voltage and the second voltage, detect at least one of i) the presence of a soft starter, and ii) the activity of the soft starter ramping up current to the compressor.

In other features, the soft starter detection module is configured to: determine a first voltage-based on a square root of an averaged sum of squares of the samples; determine a second voltage-based on a peak voltage of the samples; and based on the first voltage and the second voltage, detect at least one of i) the presence of a soft starter, and ii) the activity of the soft starter ramping up current to the compressor.

In other features, the heating ventilation and air-conditioning system further includes: the soft starter; the compressor; a contactor connected between the soft starter and the compressor; and a control module configured to close the contactor to supply current from the soft starter to the compressor.

In other features, the control module is configured to enable the at least one analog-to-digital converter to sample the voltage signal subsequent to closing the contactor.

In other features, the one or more power lines are either i) supplying power from the soft starter to the contactor, or ii) supplying power from the contactor to the compressor.

In other features, a soft starter detection method for a heating ventilation and air-conditioning system is disclosed. The heating ventilation and air-conditioning system includes a voltage-based protection module configured to execute one or more voltage-based protection algorithms to protect a compressor. The method includes: sampling a voltage signal on or across one or more power lines to provide samples, the one or more power lines supplying power to the compressor; based on the samples, i) detecting presence of a soft starter supplying the power to the compressor, and ii) detecting activity of the soft starter ramping up current to the compressor; and based on detecting the presence of the soft starter and the activity of the soft starter, disabling voltage-based protection provided by the voltage-based protection module.

In other features, the soft starter detection method further includes: disabling the voltage-based protection provided by the voltage-based protection module during a soft start ramp up period; and enabling the voltage-based protection provided by the voltage-based protection module in response to detecting an end of the soft start ramp up period.

In other features, the soft starter detection method further includes: detecting whether the voltage signal is a chopped voltage signal; in response to detecting that the voltage signal is a chopped voltage signal, determining that the soft starter is ramping up current to the compressor; and in response to detecting that the voltage signal is not a chopped voltage signal, determining that the soft starter is not ramping up current to the compressor.

In other features, the soft starter detection method further includes: determining a first root mean square voltage of the voltage signal; determining a second root mean square voltage of the voltage signal; based on a difference between the first root mean square voltage and the second root mean square voltage, determining whether the soft starter is ramping up the current to the compressor; and disabling the voltage-based protection provided by the voltage-based protection module in response to determining that the soft starter is ramping up the current to the compressor.

In other features, the soft starter detection method further includes: determining the first root mean square voltage-based on a square root of an average sum of squares of the samples of the voltage signal; and determining the second root mean square voltage-based on a peak of the samples of the voltage signal divided by a square root of 2.

In other features, the soft starter detection method further includes: tracking an amount of time during a startup of the compressor that the soft starter is ramping up current to the compressor; comparing the amount of time to a maximum ramp time; and based on the comparison of the amount of time and the maximum ramp time, enabling the voltage-based protection provided by the voltage-based protection module.

In other features, the soft starter detection method further includes: in response to the amount of time being longer than the maximum ramp time, enabling the voltage-based protection provided by the voltage-based protection module; and in response to the amount of time being less than or equal to the maximum ramp time, maintaining the voltage-based protection module in a disabled state.

In other features, the soft starter detection method further includes: determining a peak voltage of the samples; determining a present partial sum of the samples; determining an accumulated partial sum based on the present partial sum; determining a first voltage-based on the accumulated partial sum; determining a second voltage-based on the peak voltage; and based on the first voltage and the second voltage, detecting at least one of i) the presence of a soft starter, and ii) the activity of the soft starter ramping up current to the compressor.

In other features, the soft starter detection method further includes: determining a first voltage-based on a square root of an averaged sum of squares of the samples; determining a second voltage-based on a peak voltage of the samples; and based on the first voltage and the second voltage, detecting at least one of i) the presence of a soft starter, and ii) the activity of the soft starter ramping up current to the compressor.

In other features, the soft starter detection method further includes: closing a contactor to supply current from the soft starter to the compressor; and enabling sampling of the voltage signal subsequent to closing the contactor.

In other features, the one or more power lines either i) supply power from the soft starter to the contactor, or ii) supply power from the contactor to the compressor.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

In the drawings, reference numbers may be reused to identify similar and/or identical elements.

DETAILED DESCRIPTION

Figure 1:
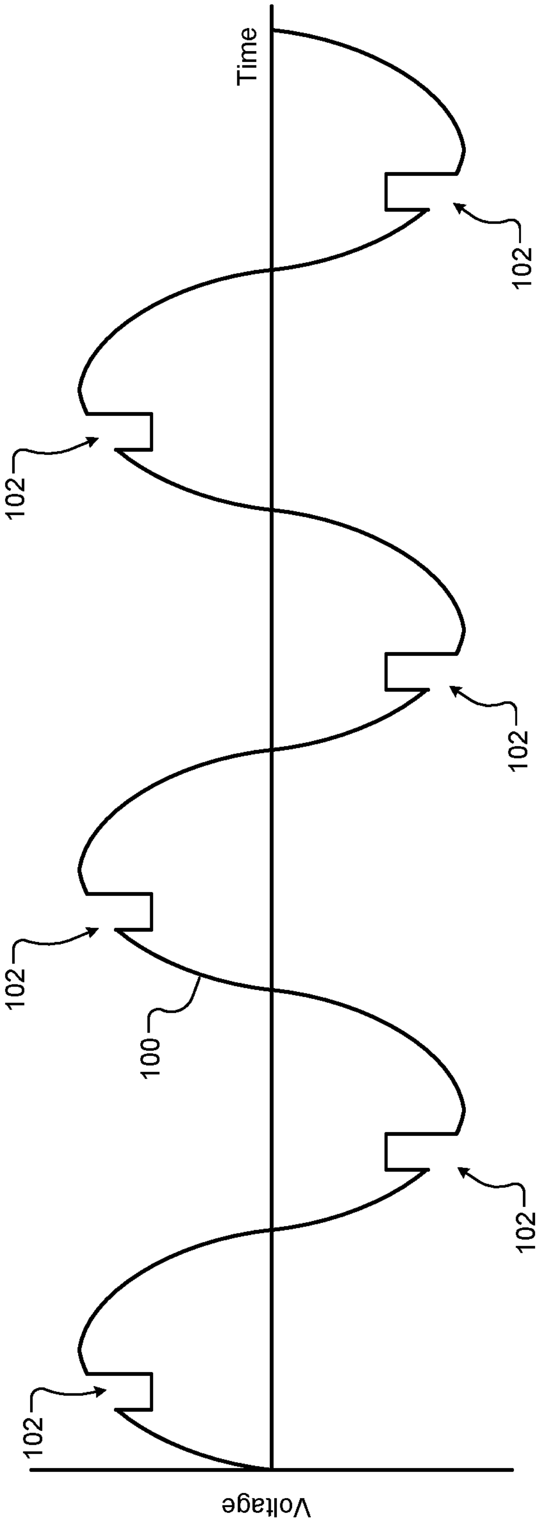
FIG. 1 is an example voltage signal output of a soft starter during an initial current ramp up period of a startup of a compressor.

In HVAC systems, compressors are often driven with soft starters to minimize the amount of inrush current experienced by the compressors during startup. Soft starters are also used to minimize voltage flickering on power lines supplying power to the compressors. A soft starter produces a chopped waveform, as shown in FIG. 1, while ramping up current during a startup of a compressor. FIG. 1 shows a voltage signal 100 out of a soft starter having a chopped waveform including irregular portions 102. The soft starter may provide a 3-phase output with three voltage signals or a single-phase output with a single voltage signal, depending on the type of compressor (i.e., 3-phase or single-phase compressor). One or more of the voltage signals may have a chopped (or distorted) waveform. The voltage signal 100 of FIG. 1 may represent, for example, the output of a single-phase soft starter, one or more phases of a 3-phase soft starter, or a voltage measured across two phases of an output of a 3-phase soft starter.

Due to a chopped waveform of a voltage signal, a voltage-based protection module monitoring the voltage signal may generate one or more nuisance faults. Example nuisance faults (or false positives) are a missing phase fault, a reverse phase fault, an undervoltage fault, a supply frequency out of range fault, etc. This is because different points of the voltage signals are sampled. Due to the chopped or irregular nature of the corresponding waveforms of the voltage signals, the voltage-based protection module can behave inappropriately and generate the nuisance faults. As an example, chopped voltage signals having irregular portions may be sampled. The samples may then be evaluated by voltage-based protection algorithms executed by the voltage-based protection module. The calculations performed by these algorithms are based on the samples, which can result in false positives with regards to detecting faults. For example, if there is a 25% phase-to-phase deviation between samples of different phase voltage signals, then a corresponding voltage-based protection module may detect a fault due to the sampling of chopped (or irregular) portions of the voltage signals. The voltage-based protection module, based on the fault, may then shut OFF the corresponding compressor.

The examples set forth herein include an HVAC system that includes a protection module including a voltage-based protection module and a soft starter detection module. The soft starter detection module detects active presence (or ramping activity) of a soft starter and absence of the soft starter during startup periods of a compressor. The soft starter detection module enables and disables the voltage-based protection module based on the active presence and absence of the soft starter. This prevents false positives during startup. The soft starter detection module disables the voltage-based protection module for the period of time when the soft starter is ramping up current to the compressor.

Figure 2:
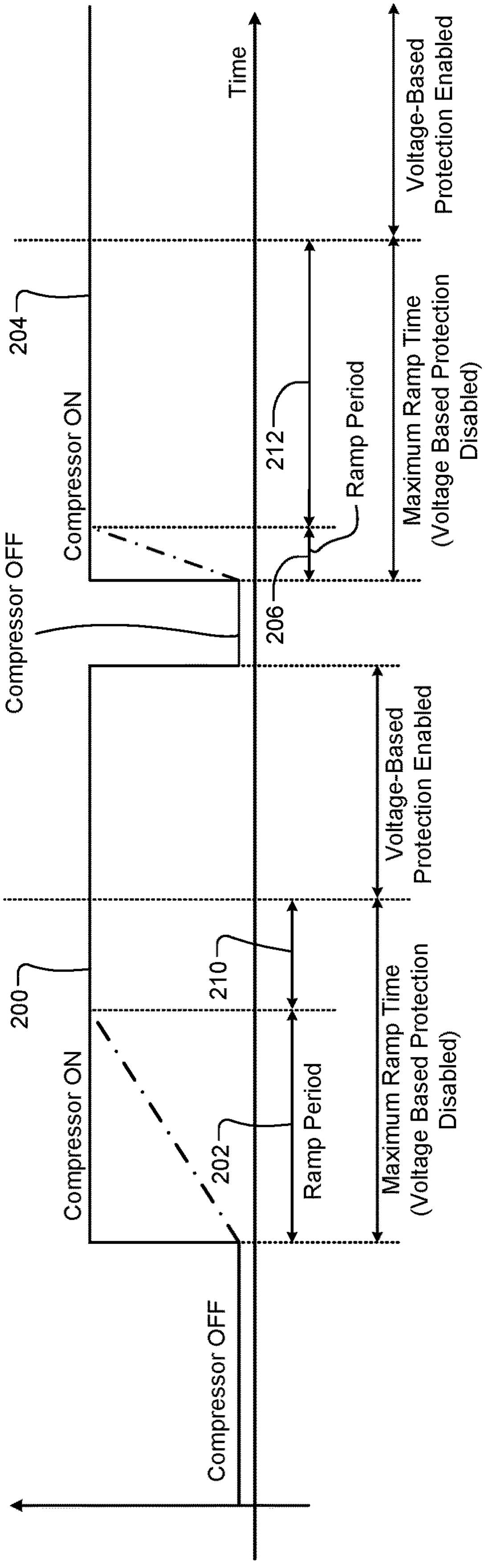
FIG. 2 is an example plot of compressor ON and OFF periods illustrating ramp up periods, maximum ramp time, and voltage protection periods.

The ramp up time of a compressor is not consistent and thus can vary. FIG. 2 shows a stepped waveform illustrating example OFF and ON periods of a compressor including actual ramp up periods during startup of the compressor. A first compressor ON period 200 is shown having a first ramp up period 202. The compressor is turned OFF and then turned back ON. A second compressor ON period 204 is shown having a second ramp up period 206. The second ramp up period 206 is shorter than the first ramp up period 202. In order to disable the voltage-based protection module for the duration of any ramp up period, the voltage-based protection module may be disabled for a maximum ramp up period during each startup, where each ramp up period has the same or a shorter duration than the maximum ramp up period. However, if voltage-based protection is disabled for the maximum ramp up period, then as can be seen in FIG. 2, there are intermediate unprotected periods 210, 212 during which the current of the compressor is up (e.g., above a predetermined level) and/or no longer increasing and voltage-based protection is disabled. This occurs between i) the current ramped up periods and ii) the points in time when the maximum ramp up periods end and voltage-based protection is enabled. Voltage-based protection is not provided during the intermediate unprotected periods 210, 212.

Maintaining the disablement of voltage-based protection for a maximum soft start ramp time can also result in erratic behavior by a protection module executing voltage-based protection algorithms. This may occur, for example, when a system operator sets a soft starter ramp time to be greater than the maximum soft start ramp time. In this situation, a period exists when the current to the compressor is still being ramped up and thus a soft starter is still providing a chopped waveform and voltage-based protection is enabled. As another example, due to load variations, a soft starter ramp time may be less than the maximum soft starter ramp time. As a result, the voltage-based protection algorithms remain inactive for the maximum soft starter ramp time and an intermediate unprotected period exists, which can negatively affect life of motor windings in case of a voltage-based fault occurring during the unprotected intermediate period.

In order to eliminate the described intermediate unprotected periods 210, 212, the soft starter detection module may not disable the voltage-based protection module for a maximum amount of ramp time, but rather for an actual amount of ramp time. The soft starter detection module detects (i) when the soft starter is actively ramping up the current and thus is providing a chopped voltage signal output, and (ii) when the soft starter stops actively ramping up the current and thus provides a voltage signal output that is not chopped. The soft starter detection module disables voltage protection during the ramp up period and enables voltage protection at the end of the ramp up period.

Figure 3:
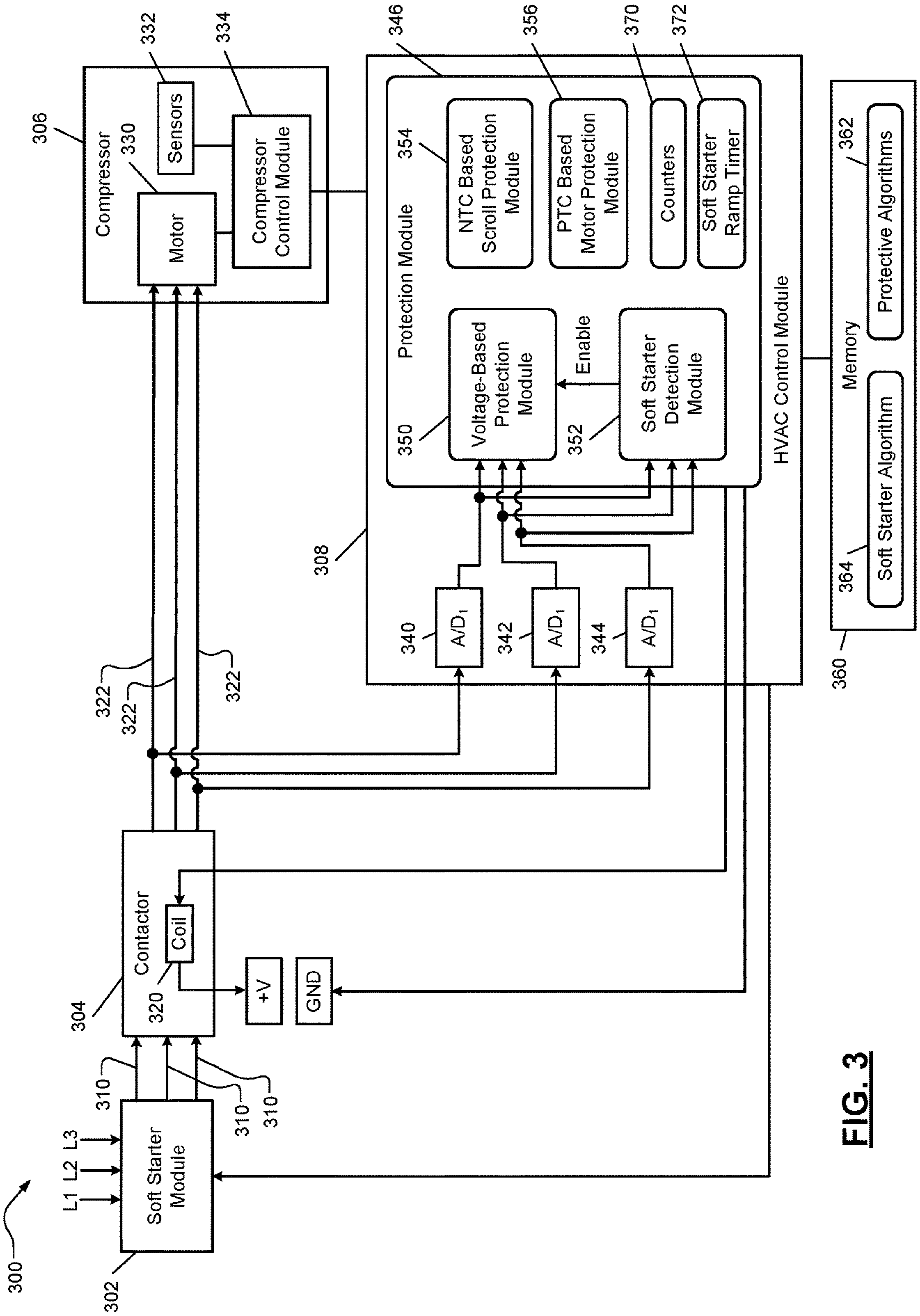
FIG. 3 is an example HVAC system including a soft starter detection module in accordance with the present disclosure.

FIG. 3 shows a HVAC system 300 including a soft starter module 302, a contactor 304, a compressor 306 and a HVAC control module 308. The soft starter module 302 may be referred to as a soft starter and receives utility power. The utility power may be in the form of 3-phase power provided via lines L1, L2, L3. The soft starter 302 supplies the 3-phase voltage output signals represented by lines 310 to the contactor 304. Although the soft starter 302 is shown as a 3-phase soft starter, the soft starter 302 may be implemented as a single-phase soft starter and output a single phase voltage signal instead of 3-phase voltage signals. During startup of the compressor 306, the soft starter 302 ramps up current supplied to the contactor 304 via the lines 310. Startup of the compressor 306 refers to when the compressor 306 is turned ON and current to the compressor 306 is ramped up from zero current to a predetermined current level.

The contactor 304 may be implemented as a relay and include a coil 320 that is energized to close the contactor 304 and transfer power from the lines 310 to lines 322, which supply power to the compressor 306. The power supplied via the lines 322 may be provided to a motor 330 of the compressor 306. The compressor 306 may further include sensors 332 and a compressor control module 334. The compressor control module 334 may operate the motor 330 based on outputs of the sensors 332. The sensors 332 may include voltage sensors, current sensors, temperature sensors, and/or other sensors.

The HVAC control module 308 controls operation of the contactor 304 and the compressor 306. The HVAC control module 308 may include analog-to-digital (A/D) converters 340, 342, 344 and a protection module 346. The protection module 346 controls state of the coil 320 and as a result ON and OFF states of the contactor 304 and ON and OFF states of the motor 330 of the compressor 306. The protection module 346 may include a voltage-based protection module 350, a soft starter detection module 352, a NTC based scroll protection module 354 and a PTC based motor protection module 356. The A/D converters 340, 342, 344 convert analog voltage signals to digital voltage signals. The analog voltage signals may be the voltage signals on the lines 322, as shown, or may be voltage signals on lines 310. The A/D converters 340, 342, 344 sample the analog voltage signals and provide the samples to the modules 350, 352. The modules 354, 356 may operate based on outputs of the sensors 332.

The soft starter detection module 352 enables and disables the voltage-based protection module 350 based on detection of active ramping up of current by the soft starter 302 to the compressor 306. The soft starter detection module 352 detects the installation (or presence) of the soft starter 302 and whether the soft starter 302 is actively ramping up current based on the samples from the A/D converters 340, 342, 344. This allows the soft starter detection module 352 and the protection modules 350, 354, 356 to be compatible with HVAC systems that do include a soft starter and HVAC systems that do not include a soft starter. The modules 350, 354, 356 implement corresponding protective algorithms 362, which may be stored in memory 360, such as a reverse phase protection algorithm, a single phasing protection algorithm, over and under voltage protection algorithms, a phase imbalance protection algorithm, a frequency supply over and under range protection algorithms, a compressor short cycling protection algorithm, a PTC based motor protection algorithm, and a NTC based scroll over temperature protection algorithm. The memory may also store a soft starter algorithm 364 that is implemented by the soft starter detection module 352 for detecting ramping up of current to the compressor 306 and disabling and enabling the voltage-based protection based on this detection. The soft starter algorithm 364 does not conflict with the protective algorithms 362 and hence the protection module 346 does not perform erratically.

The protection module 346 and/or the soft starter detection module 352 may include counters 370, such as a soft starter present counter and a soft starter absent counter. The soft starter present counter is used to confirm, during a startup event of the compressor 306, that the soft starter 302 is actively ramping up current. The soft starter absent counter is used to confirm, during a startup event of the compressor 306, that the soft starter has completed ramping up the current. The protection module 346 and/or the soft starter detection module 352 may also include a soft starter ramp timer 372. The soft starter ramp timer 372 is used to determine ramp time of the soft starter. If the ramp time exceeds a set amount of time (e.g., 0.5-2.0 seconds), the soft starter detection module 352 and/or the protection module 346 may override operation of the soft starter detection module 352 and enable the voltage-based protection module 350. This assures that the voltage-based protection modules 350 and implementation of the corresponding stated algorithms are not disabled for too long and/or an indefinite amount of time.

When the protection module 346 detects a fault, for example, via one or more of the modules 350, 354, 356 and/or via one or more of the algorithms implemented by the modules 350, 354, 356, the protection module 346 de-energizes (or opens) the contactor 304. When voltage-based protection is disabled during an initial startup period, the protection module 346 may de-energize the contactor 304 if one or more of the modules 354, 356 detects a fault. The protection module 346 may not de-energize the contactor 304 if the voltage-based protection module 350 is not completely disabled and detects a fault during the initial startup period when voltage-based protection is disabled. If a soft starter is not incorporated in the HVAC system 300, then voltage-based protection is enabled during startup of the compressor 306.

Figure 4:
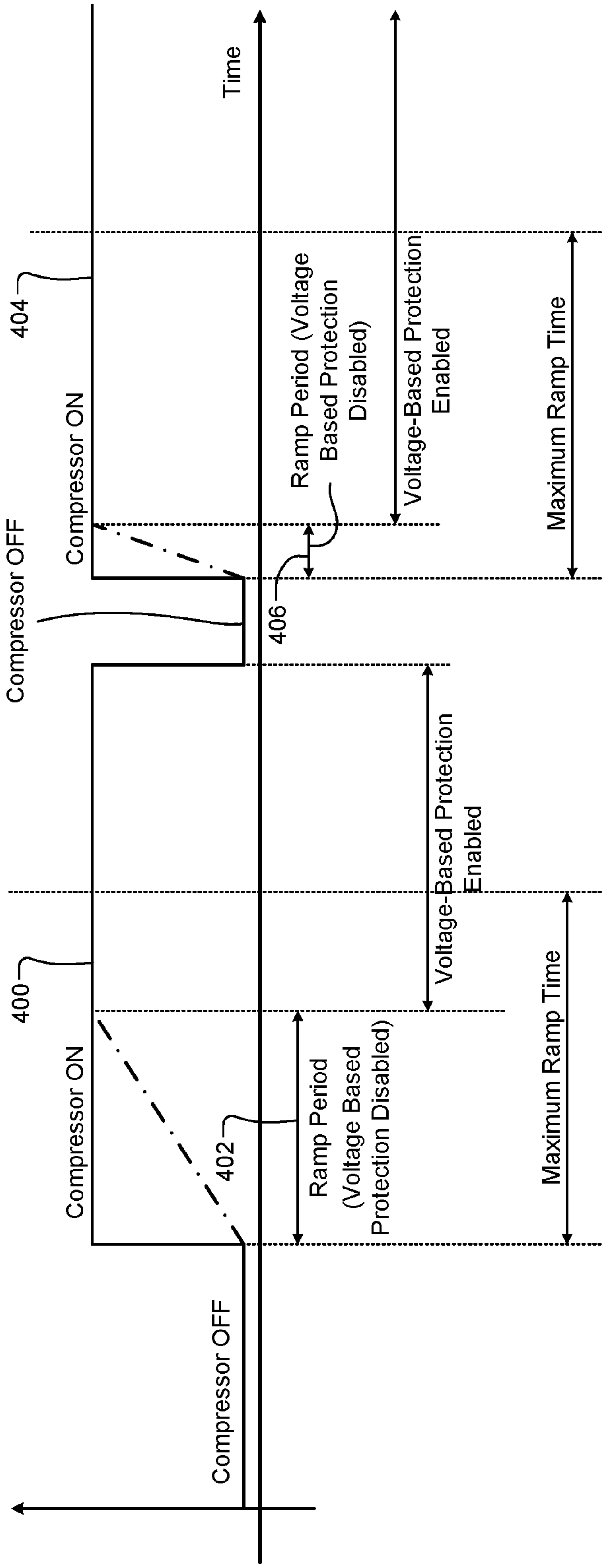
FIG. 4 is an example plot of compressor ON and OFF periods illustrating ramp up periods, maximum ramp time, and voltage protection periods coinciding with the ramp up periods in accordance with the present disclosure.

FIG. 4 shows a plot of compressor ON and OFF periods including actual ramp up periods during startup of the compressor. A first compressor ON period 400 is shown having a first ramp up period 402. The compressor is turned OFF and then turned back ON. A second compressor ON period 404 is shown having a second ramp up period 406. The second ramp up period 406 is shorter than the first ramp up period 402. Voltage-based protection is disabled for the ramp up periods 402, 406 and is enabled when the ramp up periods 402, 406 are over. As can be seen, voltage-based protection is disabled for shorter periods of time than a maximum ramp up time. The voltage-based protection may be disabled for the maximum ramp up time if the actual ramp up period extends to the end of the maximum ramp up period. This minimizes the periods of time for which compressor protection algorithms are disabled. The disabled periods are the shorter of i) the periods of soft starter ramp up activity, and ii) the maximum ramp up period.

The soft starter detection module 352 of FIG. 3 may monitor a three-phase voltage signal at each powerup of the compressor 306. The three-phase voltage signal refers to collectively the voltage signals on the lines 310 or 322, which each carry a respective single phase voltage signal. The soft starter 302 produces a chopped voltage signal waveform on one or more phases of the three-phase voltage signal to reduce inrush current during initial start periods of the compressor. Any of the three phase voltage signals may be monitored. The lines 310 may be referred to as L1', L2' and L3', respectively. The lines 322 may be referred to as L1", L2", and L3", respectively. In addition, or alternatively, voltages between the three phase voltage signals may be monitored and sampled by the A/D converters 340, 342, 344. For example, a L1'-L2' voltage, a L2'-L3' voltage, a L1'-L3' voltage, a L1"-L2" voltage, a L2"-L3" voltage, and/or a L1"-L3" voltage may be monitored and sampled.

Figure 5A:
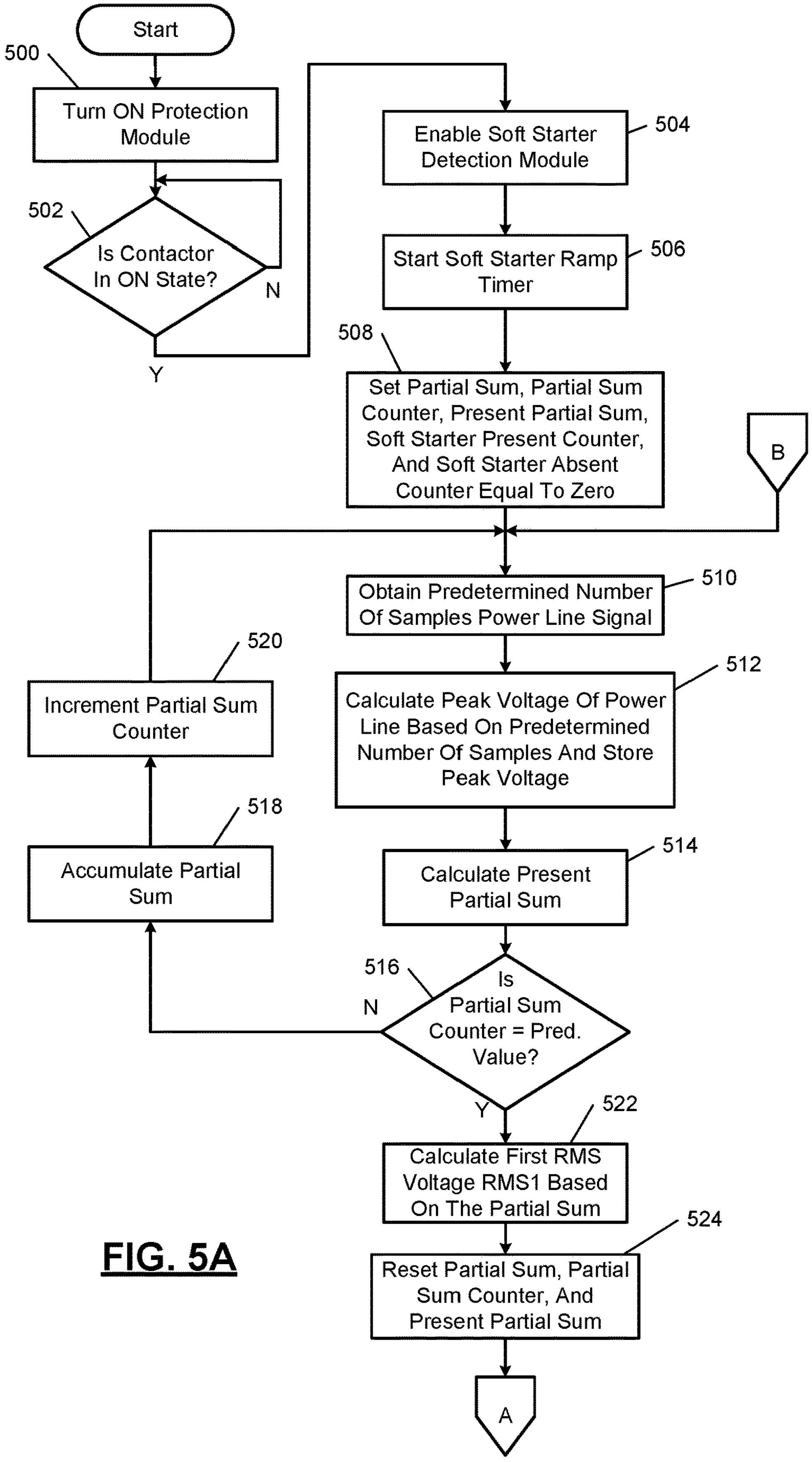
FIGS. 5A and 5B (collectively FIG. 5) illustrate a soft starter detection method in accordance with the present disclosure.
Figure 5B:
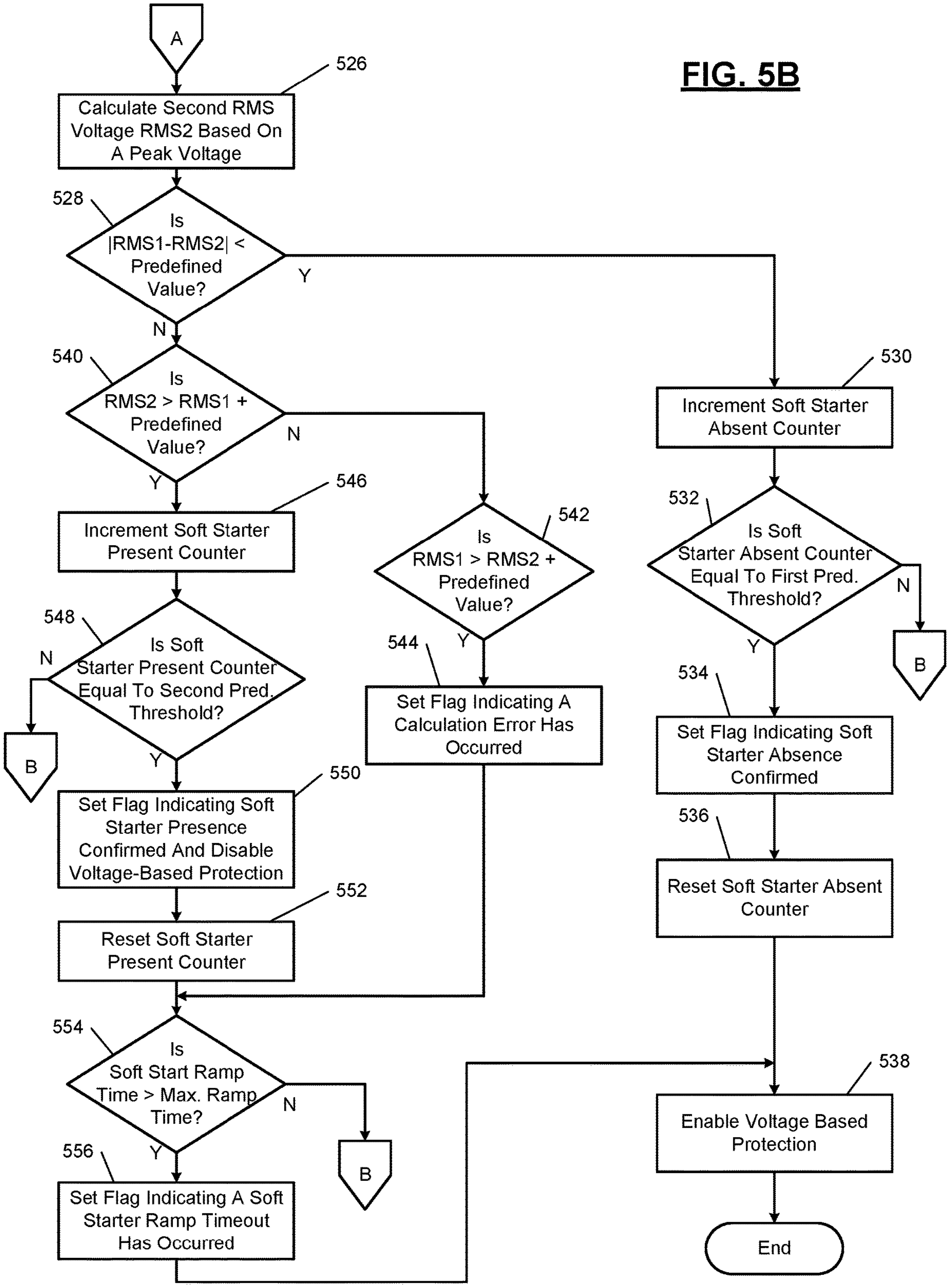

FIGS. 5A and 5B (collectively FIG. 5) shows a soft starter detection method. The method may be performed by the HVAC control module 308 and the modules and devices thereof. This method may be implemented each time a compressor is being started (or turned ON). The HVAC control module 308 of FIG. 3 may control the turning ON of the compressor 306 and may signal the soft starter when the compressor is to be turned ON. The HVAC control module 308 may also control timing of when the soft starter is to provide a chopped waveform to ramp up current to the compressor. At 500, the HVAC control module 308 may turn ON the protection module 346.

At 502, the protection module 346 may determine whether the contactor 304 is in a closed (or ON) state (e.g., the coil 320 is energized). If yes, operation 504 is performed. At powerup, the protection module 346 turns ON the contactor 304. At 504, the protection module 346 enables the soft starter detection module 352.

At 506, the protection module 346 and/or the soft starter detection module 352 starts the soft starter ramp timer 372. At 508, the soft starter detection module 352 may initialize and/or set a partial sum, a partial sum counter, a present partial sum, a soft starter present counter, and a soft starter absent counter equal to zero.

At 510, the soft starter detection module 352 obtains a predetermined number of instantaneous voltage samples of one or more power line signals from one or more A/D converters (e.g., one or more of the A/D converters 340, 342, 344). In one embodiment, a single phase or a voltage across two phases is monitored. In another embodiment, two phases or two voltages across two pairs of phases are monitored. As an example, one of the voltage signals on one of the lines 322 may be monitored and 25 microseconds (μs) of samples of the one of the voltage signals may be collected. This may include collecting 80 samples over the 25 μs period.

At 512, the soft starter detection module 352 may calculate a peak voltage of the voltage signal based on the predetermined number of samples and store the peak voltage in a memory (e.g., the memory 360) or other storage device (e.g., a register or a buffer of the soft starter detection module 352). As an example, the peak voltage $V_P$ may be determined according to equation 1, where S1-SN are the samples, and N is the number of samples.

$$V_P = \text{MAX}\ (S1, S2, \ldots, SN) \tag{1}$$

At 514, the soft starter detection module 352 may calculate the present partial sum PPS. This may be done according to equation 2.

$$PPS = \frac{S1^2 + S2^2 + \ldots + SN^2}{N} \tag{2}$$

At 516, the soft starter detection module 352 may determine whether the partial sum counter is equal to a predetermined value (e.g., 50). If not, operation 518 may be performed, otherwise operation 522 may be performed.

At 518, the soft starter detection module 352 may calculate an accumulated partial sum, which may be equal to a sum of the present partial sum PPS and the partial sum PS (or last accumulated partial sum value). At 520, the soft starter detection module 352 may increment the partial sum counter. For example, the partial sum counter value may be set equal to the partial sum counter value plus one. Operation 510 may be performed subsequent to performing operation 520.

At 522, the soft starter detection module 352 may calculate a first root mean square (RMS) voltage RMS1 based on the accumulated partial sum PS. For example, RMS1 may be calculated using equation 3.

$$\text{RMS1} = \sqrt{PS} \tag{3}$$

By performing operations 510, 512, 514, 516, 518, 520, RMS1 is calculated every predetermined period of time (e.g., 100 milliseconds (ms)=80×50×25 μs), where 80 is the number of samples obtained for each of 50 iterations.

At 524, the soft starter detection module 352 may reset the partial sum (or accumulated partial sum), partial sum counter, and the present partial sum to zero. Operation 526 is performed subsequent to operation 524.

At 526, the soft starter detection module 352 may calculate a second RMS voltage RMS2 based on the peak voltage. This peak voltage may be a peak voltage determined during a last iteration of operation 512 or may be a peak of the peak voltages determined during the last set of iterations of operations 510, 512, 514, 516, 518, 520. For example, the peak voltage may be the greatest of the 51 iterations of peak voltages determined during iterations of operations 510, 512, 514, 516, 518, 520, when the predetermined iteration value is equal to 50. RMS2 may be calculated using equation 4. In one embodiment, at least operations 512, 522 and 526 are repeated for a predetermined period of time each time the compressor 306 is turned ON. The predetermined period may be 5 seconds or less. As an example, the predetermined period may be 400 ms.

$$RMS2 = \frac{VP}{\sqrt{2}} \tag{4}$$

At 528, the soft starter detection module 352 may determine whether an absolute difference between RMS1 and RMS2 is less than a predefined value (e.g., 5 V). The predefined value may be referred to as an empirical offset value. If yes, operation 530 may be performed, otherwise operation 540 may be performed. In an embodiment, soft starter absence is detected when RMS2 is less than or equal to a sum of RMS1 and the predetermined empirical offset value. These determinations may be made to determine if a waveshape of the voltage signal being monitored is sinusoidal. When the voltage signal is sinusoidal and not chopped, absence of soft starter activity to ramp up current is detected.

At 530, the soft starter detection module 352 may increment the soft starter absent counter. At 532, the soft starter detection module 352 may determine whether the soft starter absent counter is equal to a first predetermined threshold (e.g., 4) or other predetermined threshold. In an embodiment the first predetermined threshold is greater than or equal to 1. If no, operation 510 may be performed, otherwise operation 534 may be performed.

At 534, the soft starter detection module 352 may set a flag in memory indicating that soft starter absence is confirmed. Soft starter absence may refer to a soft starter not being incorporated in the HVAC system 300 and/or the soft starter 302 not ramping up current to the compressor 306. This indicates that the soft starter 302 has finished ramping up current to the compressor 306. In one embodiment, soft starter absence is determined when RMS1 is equal to RMS2. In another embodiment, soft starter absence is determined when the absolute difference between RMS1 and RMS2 is less than or equal to the predetermined empirical offset value. At 536, the soft starter detection module 352 may reset the soft starter absent counter to zero.

At 538, the soft starter detection module 352 may enable the voltage-based protection module 350 and/or implementation of voltage-based protection algorithms, such as the reverse phase protection algorithm, single phasing protection algorithm, over and under voltage protection algorithms, phase imbalance protection algorithm, frequency supply over and under range protection algorithms, and compressor short cycling protection algorithm. This may include allowing the voltage-based protection module 350 to turn OFF the compressor when one or more of the voltage-based protection algorithms detect a fault. In one embodiment, as soon as the soft start period of ramping up current to the compressor 306 is over, the soft starter detection module 352 enables the voltage-based protection.

At 540, the soft starter detection module 352 may determine whether RMS2 is greater than a sum of RMS1 and the predefined value (e.g., 5V). If no, operation 542 may be performed, otherwise operation 546 may be performed. This determination is made to determine if a waveshape of the voltage signal being monitored is chopped for an initial portion of a startup period. When the voltage signal is chopped, presence of soft starter activity to ramp up current is detected.

At 542, the soft starter detection module 352 may determine whether RMS1 is greater than a sum of RMS2 and the predefined value (e.g., 5V). In one embodiment, the predefined value is 0V. In another embodiment, the predetermined value is less than 5V. If yes, operation 544 is performed.

At 544, the soft starter detection module 352 may set a flag indicating a calculation error has occurred. In the event of a calculation error, the values of RMS1 and RMS2 may be discarded. Operation 554 may be performed subsequent to operation 544.

At 546, the soft starter detection module 352 may increment the soft starter present counter. At 548, the soft starter detection module 352 may determine whether the soft starter present counter is equal to a second predetermined threshold (e.g., 4) or other predetermined threshold. In an embodiment, the second predetermined threshold is greater than or equal to 1. The second predetermined threshold may be the same or different than the first predetermined threshold. If no, operation 510 may be performed, otherwise operation 550 may be performed. By performing operations 532 and 548, RMS1 and RMS2 are confirmed every predetermined period of time (e.g., 4×100 ms or 400 ms, where 4 is the first and/or second predetermined threshold). In an embodiment, the second predetermined threshold is different than the first predetermined threshold.

At 550, the soft starter detection module 352 may set a flag indicating soft starter presence is confirmed and disable voltage-based protection. Soft starter presence may refer to the HVAC system 300 including the soft starter 302 and the soft starter 302 ramping up current to the compressor 306. This may include disabling the voltage-based protection module 350 and/or preventing voltage-based protection operations from being performed. Execution of voltage-based protection algorithms may be prevented. At 552, the soft starter detection module 352 may reset the soft starter present counter to zero.

At 554, the soft starter detection module 352 may determine whether the soft starter ramp time is greater than the maximum ramp time. The max ramp time may be set based on a type of load and/or size of the compressor 306. In one embodiment, the maximum ramp time is not more than 10 seconds. If yes, operation 556 may be performed, otherwise operation 510 may be performed. The soft starter ramp time is the current amount of time that the soft starter 302 has been ramping up current to the compressor 306 from the point in time when the compressor was last turned ON.

At 556, the soft starter detection module 352 may set a flag indicating a soft starter ramp timeout has occurred. Operation 538 may be performed subsequent to performing operation 554. The method may end subsequent to performing operation 538.

The above-described examples include enabling protection modules and implementation of protection algorithms when soft starter action of ramping up current to a compressor is over, thereby avoiding exposure of compressor motor windings to high current levels due to faults, such as high current level experienced during a single phasing fault. The soft starter algorithm implemented by performing the above-described method is used to detect the end of a ramp up period regardless of a length of the ramp up period. The examples disclosed herein are implementable independent of soft starter current rating and regardless of soft starter make or model. The voltage-based protection is disabled independent of maximum ramp period, which may be set by a system operator.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation) (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

What is claimed is:

1. A heating ventilation and air-conditioning system comprising:
- at least one analog-to-digital converter configured to sample a voltage signal on or across one or more power lines to provide a plurality of samples, the one or more power lines supplying power to a compressor;
- a voltage-based protection module configured to execute one or more voltage-based protection algorithms to protect the compressor; and
- a soft starter detection module configured
  - based on the plurality of samples, to detect i) presence of a soft starter, and ii) activity of the soft starter ramping up current to the compressor,
  - based on detecting the presence of the soft starter and the activity of the soft starter, disable voltage-based protection provided by the voltage-based protection module,
  - reenable the voltage-based protection subsequent to a ramp up period during which the soft starter is ramping up the current to the compressor,
  - disable the voltage-based protection provided by the voltage-based protection module during a soft start ramp up period,
  - enable the voltage-based protection provided by the voltage-based protection module in response to detecting an end of the soft start ramp up period,
  - detect whether the voltage signal is a chopped voltage signal,
  - in response to detecting that the voltage signal is a chopped voltage signal, determine that the soft starter is ramping up current to the compressor, and
  - in response to detecting that the voltage signal is not a chopped voltage signal, determine that the soft starter is not ramping up current to the compressor,
  - wherein the chopped voltage signal is a chopped sinusoidal wave having at least one of irregular and distorted portions.

2. The heating ventilation and air-conditioning system of claim 1, wherein the soft starter detection module is configured to:
- determine a first root mean square voltage of the voltage signal;
- determine a second root mean square voltage of the voltage signal;
- based on a difference between the first root mean square voltage and the second root mean square voltage, determine whether the soft starter is ramping up the current to the compressor; and disable the voltage-based protection provided by the voltage-based protection module in response to determining that the soft starter is ramping up the current to the compressor.

3. The heating ventilation and air-conditioning system of claim 2, wherein the soft starter detection module is configured to:

determine the first root mean square voltage-based on a square root of an average sum of squares of the plurality of samples of the voltage signal; and determine the second root mean square voltage-based on a peak of the plurality of samples of the voltage signal divided by a square root of 2.

4. The heating ventilation and air-conditioning system of claim 1, wherein the soft starter detection module is configured to:

track an amount of time during a startup of the compressor that the soft starter is ramping up current to the compressor;

compare the amount of time to a maximum ramp time; and based on the comparison of the amount of time and the maximum ramp time, enable the voltage-based protection provided by the voltage-based protection module.

5. The heating ventilation and air-conditioning system of claim 4, wherein the soft starter detection module is configured to:

in response to the amount of time being longer than the maximum ramp time, enable the voltage-based protection provided by the voltage-based protection module; and in response to the amount of time being less than or equal to the maximum ramp time, maintaining the voltage-based protection module in a disabled state.

6. The heating ventilation and air-conditioning system of claim 1, wherein the soft starter detection module is configured to:

determine a first voltage-based on a square root of an averaged sum of squares of the plurality of samples;

determine a second voltage-based on a peak voltage of the plurality of samples; and based on the first voltage and the second voltage, detect at least one of i) the presence of a soft starter, and ii) the activity of the soft starter ramping up current to the compressor.

7. The heating ventilation and air-conditioning system of claim 1, further comprising:

the soft starter;

the compressor;

a contactor connected between the soft starter and the compressor; and a control module configured to close the contactor to supply current from the soft starter to the compressor.

8. The heating ventilation and air-conditioning system of claim 7, wherein the control module is configured to enable the at least one analog-to-digital converter to sample the voltage signal subsequent to closing the contactor.

9. The heating ventilation and air-conditioning system of claim 7, wherein the one or more power lines are either i) supplying power from the soft starter to the contactor, or ii) supplying power from the contactor to the compressor.

10. A heating ventilation and air-conditioning system comprising:

at least one analog-to-digital converter configured to sample a voltage signal on or across one or more power lines to provide a plurality of samples, the one or more power lines supplying power to a compressor;

a voltage-based protection module configured to execute one or more voltage-based protection algorithms to protect the compressor; and a soft starter detection module configured, based on the plurality of samples, to detect i) presence of a soft starter, and ii) activity of the soft starter ramping up current to the compressor, and to, based on detecting the presence of the soft starter and the activity of the soft starter, disable voltage-based protection provided by the voltage-based protection module, wherein the soft starter detection module is configured to determine a peak voltage of the plurality of samples, determine a present partial sum of the plurality of samples, determine an accumulated partial sum based on the present partial sum, determine a first voltage based on the accumulated partial sum, determine a second voltage based on the peak voltage, and based on the first voltage and the second voltage, detect at least one of i) the presence of a soft starter, and ii) the activity of the soft starter ramping up current to the compressor.

11. The heating ventilation and air-conditioning system of claim 10, wherein the soft starter detection module is configured to:

disable the voltage-based protection provided by the voltage-based protection module during a soft start ramp up period; and enable the voltage-based protection provided by the voltage-based protection module in response to detecting an end of the soft start ramp up period.

12. The heating ventilation and air-conditioning system of claim 11, wherein the soft starter detection module is configured to:

detect whether the voltage signal is a chopped voltage signal;

in response to detecting that the voltage signal is a chopped voltage signal, determine that the soft starter is ramping up current to the compressor; and in response to detecting that the voltage signal is not a chopped voltage signal, determine that the soft starter is not ramping up current to the compressor.

13. The heating ventilation and air-conditioning system of claim 10, further comprising a control module configured to:

close a contactor to supply current from the soft starter to the compressor; and enable sampling of the voltage signal subsequent to closing the contactor.

14. The heating ventilation and air-conditioning system of claim 10, further comprising:

the soft starter;

the compressor;

a contactor connected between the soft starter and the compressor; and a control module configured to close the contactor to supply current from the soft starter to the compressor.

15. A soft starter detection method for a heating ventilation and air-conditioning system, the heating ventilation and air-conditioning system comprising a voltage-based protection module configured to execute one or more voltage-based protection algorithms to protect a compressor, the method comprising:

sampling a voltage signal on or across one or more power lines to provide a plurality of samples, the one or more power lines supplying power to the compressor;

based on the plurality of samples, i) detecting presence of a soft starter supplying the power to the compressor, and ii) detecting activity of the soft starter ramping up current to the compressor;

based on detecting the presence of the soft starter and the activity of the soft starter, disabling voltage-based protection provided by the voltage-based protection module;

reenabling the voltage-based protection subsequent to a ramp up period during which the soft starter is ramping up the current to the compressor;

tracking an amount of time during a startup of the compressor that the soft starter is ramping up current to the compressor;

comparing the amount of time to a maximum ramp time;

based on the comparison of the amount of time and the maximum ramp time, enabling the voltage-based protection provided by the voltage-based protection module;

in response to the amount of time being longer than the maximum ramp time, enabling the voltage-based protection provided by the voltage-based protection module;

in response to the amount of time being less than or equal to the maximum ramp time, maintaining the voltage-based protection module in a disabled state;

determining a peak voltage of the plurality of samples;

determining a present partial sum of the plurality of samples;

determining an accumulated partial sum based on the present partial sum;

determining a first voltage based on the accumulated partial sum;

determining a second voltage based on the peak voltage; and based on the first voltage and the second voltage, detecting at least one of i) the presence of a soft starter, and ii) the activity of the soft starter ramping up current to the compressor.

16. The soft starter detection method of claim 15, further comprising:

disabling the voltage-based protection provided by the voltage-based protection module during a soft start ramp up period; and enabling the voltage-based protection provided by the voltage-based protection module in response to detecting an end of the soft start ramp up period.

17. The soft starter detection method of claim 16, further comprising:

detecting whether the voltage signal is a chopped voltage signal;

in response to detecting that the voltage signal is a chopped voltage signal, determining that the soft starter is ramping up current to the compressor; and in response to detecting that the voltage signal is not a chopped voltage signal, determining that the soft starter is not ramping up current to the compressor.

18. The soft starter detection method of claim 15, further comprising:

determining a first root mean square voltage of the voltage signal;

determining a second root mean square voltage of the voltage signal;

based on a difference between the first root mean square voltage and the second root mean square voltage, determining whether the soft starter is ramping up the current to the compressor; and disabling the voltage-based protection provided by the voltage-based protection module in response to determining that the soft starter is ramping up the current to the compressor.

19. The soft starter detection method of claim 18, further comprising:

determining the first root mean square voltage-based on a square root of an average sum of squares of the plurality of samples of the voltage signal; and determining the second root mean square voltage-based on a peak of the plurality of samples of the voltage signal divided by a square root of 2.

20. The soft starter detection method of claim 15, further comprising:

determining a first voltage-based on a square root of an averaged sum of squares of the plurality of samples;

determining a second voltage-based on a peak voltage of the plurality of samples; and based on the first voltage and the second voltage, detecting at least one of i) the presence of a soft starter, and ii) the activity of the soft starter ramping up current to the compressor.

21. The soft starter detection method of claim 15, further comprising:

closing a contactor to supply current from the soft starter to the compressor; and enabling sampling of the voltage signal subsequent to closing the contactor.

22. The soft starter detection method of claim 21, wherein the one or more power lines either i) supply power from the soft starter to the contactor, or ii) supply power from the contactor to the compressor.

* * * * *